(12) United States Patent
Tamai et al.

(10) Patent No.: US 10,108,875 B2
(45) Date of Patent: Oct. 23, 2018

(54) INFORMATION PROCESSING DEVICE, INFORMATION PROCESSING METHOD, INFORMATION PROCESSING PROGRAM, AND RECORDING MEDIUM

(71) Applicant: OMRON CORPORATION, Kyoto-shi, Kyoto (JP)

(72) Inventors: Toshinori Tamai, Nara (JP); Taku Oya, Kyoto (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 15/450,634

(22) Filed: Mar. 6, 2017

(65) Prior Publication Data

US 2017/0300774 A1    Oct. 19, 2017

(30) Foreign Application Priority Data

Apr. 15, 2016   (JP) ................. 2016-082259

(51) Int. Cl.
| | | |
|---|---|---|
| *G06K 9/46* | (2006.01) | |
| *G06F 15/78* | (2006.01) | |
| *H04N 1/00* | (2006.01) | |

(52) U.S. Cl.
CPC ....... *G06K 9/4614* (2013.01); *G06F 15/7878* (2013.01); *H04N 1/0083* (2013.01); *H04N 1/00962* (2013.01)

(58) Field of Classification Search
None
See application file for complete search history.

(56) References Cited

U.S. PATENT DOCUMENTS

2006/0228027 A1 * 10/2006 Matsugu ............ G06K 9/00281
                                                                  382/181
2007/0245131 A1   10/2007 Yoshikawa et al.
(Continued)

FOREIGN PATENT DOCUMENTS

| EP | 2680560 A2 | 1/2014 |
| JP | 2010-206704 A | 9/2010 |
| JP | 2015-228187 A | 12/2015 |

OTHER PUBLICATIONS

The extended European search report (EESR) dated Aug. 16, 2017 in a counterpart European patent application.

*Primary Examiner* — Delomia L Gilliard
(74) *Attorney, Agent, or Firm* — Metrolexis Law Group, PLLC

(57) ABSTRACT

An image processing device configured to process image data obtained externally, the image processing device including a preprocessing circuit configured to carry out preprocessing during image processing; and a circuit configuration controller configured to carry out partial reconfiguration of the preprocessing circuit; the preprocessing circuit including: a plurality of arithmetic converter circuits configured to perform arithmetic computations on image data to convert the image data; and a timing control circuit provided between each one in the plurality of arithmetic converter circuits connected in order of processing, the timing control circuit configured to secure the reliable exchange of data; and the circuit configuration controller partially reconfiguring at least one arithmetic converter circuit in the plurality of arithmetic converter circuits while not partially reconfiguring the timing control circuit.

8 Claims, 12 Drawing Sheets

(56) References Cited

U.S. PATENT DOCUMENTS

2010/0225948 A1    9/2010  Sato
2011/0225415 A1*  9/2011  Yamada ........... H03K 19/17752
                                                        713/100
2015/0256687 A1    9/2015  Shinto

* cited by examiner

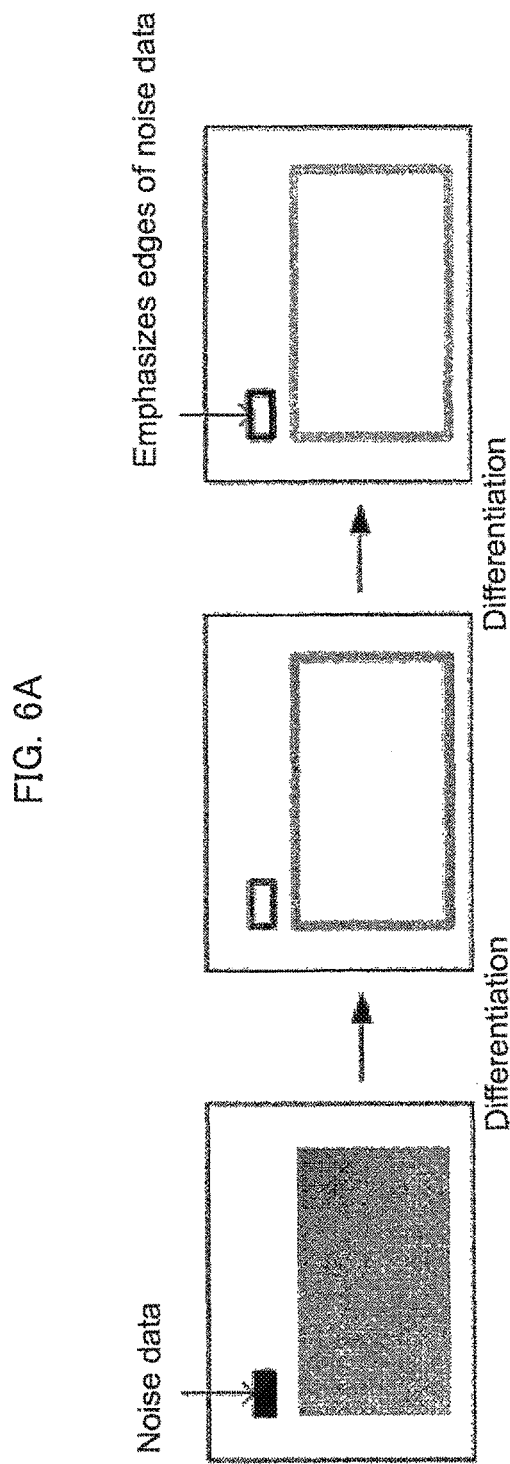

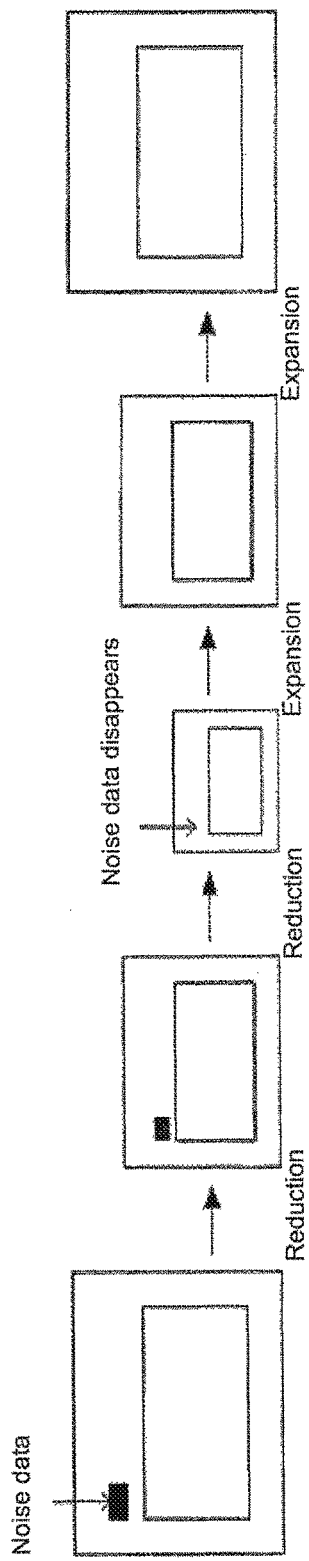

INFORMATION PROCESSING DEVICE, INFORMATION PROCESSING METHOD, INFORMATION PROCESSING PROGRAM, AND RECORDING MEDIUM

FIELD

The present invention relates generally to an image processing device and the like, and relates more specifically to an image processing device provided with a programmable logic circuit that can be partially reconfigured.

BACKGROUND

Existing image processing devices can be partially reconfigured to suit the type of image processing. This partial reconfiguration (partial reconfig) is possible by using programmable circuits, such as Field Programmable Gate Arrays (FPGA), that can be configured by a user post production.

Japanese Patent Application Publication No. 2010-206704 describes an image processing device configured to store the register settings for the next print job in flash memory when processing the current print job; the next print job begins when the register settings stored in the flash memory is written to a programmable circuit. This image processing device is able to reduce the amount of time between print jobs.

The image processing device disclosed in Japanese Patent Application Publication No. 2015-228187 detects in advance the type of object to be acquired, reconfigures a programmable circuit according to the document type, and uses the reconfigured circuit to process the image data acquired by a camera. The image processing device is thus able to reduce the wait before processing starts.

Technical Problem

The continuous flow of inspection objects requires that images are processed quickly in order to use an image processing device to inspect and measure an object.

Therefore, when a programmable circuit is adapted to this kind of image processing device, it is necessary to reduce the amount of time the programmable circuit takes to be reconfigured, to avoid significantly slowing the image processing speed.

The time reconfiguration takes depends on the size of the circuit. Therefore it tends to be difficult to further reduce the reconfiguration time in order to reduce the time between print jobs, or to reduce the wait time until processing starts as described in Japanese Patent Application Publication No. 2010-206704 and Japanese Patent Application Publication No. 2015-228187.

Embodiments of the invention aim to address these problems by providing an image processing device, and the like capable of further reducing the amount of time partial reconfiguration takes.

SUMMARY

To address the above described deficiencies, an image processing device according to an embodiment of the present invention is configured to process image data obtained externally, and includes: a preprocessing circuit configured to carry out preprocessing during image processing; and a circuit configuration controller configured to carry out partial reconfiguration of the preprocessing circuit; the preprocessing circuit including: a plurality of arithmetic converter circuits configured to perform arithmetic computations on image data to convert the image data; and a timing control circuit provided between each one in the plurality of arithmetic converter circuits connected in order of processing, the timing control circuit configured to secure the reliable exchange of data; and the circuit configuration controller partially reconfiguring at least one arithmetic converter circuit in the plurality of arithmetic converter circuits while not partially reconfiguring the timing control circuit.

In the above configuration, a timing control circuit is provided between each of the plurality of arithmetic converter circuits, therefore no problems occur in the preprocessing circuit regardless of how the arithmetic converter circuitry is reconfigured.

The configuration is also such that partial reconfiguration is performed for at least only one arithmetic converter circuit in the preprocessing circuit while not being performed for the other arithmetic converter circuits or timing control circuits. Consequently, the circuitry for partial reconfiguration is a smaller size. Thus, partial reconfiguration takes less time.

Accordingly, an image processing device can be provided that is capable of further reducing the amount of time a programmable circuit, such as an FPGA, takes to perform a partial reconfiguration.

Modifying image processing parameters may also take even less time to complete, when the parameters for image processing have been modified. Moreover, the image processing device provided is capable of quickly performing image processing that matches the modifications made without pausing operations, even when the type of object or scene to be processed changes.

To address the above described deficiencies, an image processing device according to another embodiment of the present invention is configured to process image data obtained externally, and includes: a preprocessing circuit configured to carry out preprocessing during image processing; and a circuit configuration controller configured to carry out partial reconfiguration of the preprocessing circuit; the preprocessing circuit including: at least one arithmetic converter circuit configured to perform arithmetic computations on image data to convert the image data; the arithmetic converter circuit made up of an input module configured to temporarily store data entering therein, an arithmetic module configured to perform arithmetic computations on the temporarily stored data, and an output module configured to temporarily store the computed data; and the circuit configuration controller carrying out partial reconfiguration of at least one arithmetic converter circuit while not carrying out partial reconfiguration of the input module and the output module.

With this configuration, partial reconfiguration is performed for at least one arithmetic module in the preprocessing circuit while not being performed for the other circuits. Consequently, the circuitry for partial reconfiguration is a smaller size. Thus, partial reconfiguration takes less time.

Accordingly, an image processing device can be provided that is capable of further reducing the amount of time a programmable circuit, such as an FPGA, takes to perform a partial reconfiguration.

In addition, the input module, and the output module within each of the arithmetic converter circuits are excluded from partial reconfiguration when the preprocessor circuit has a plurality of arithmetic converter circuits. Therefore, data exchange remains reliable even without providing a timing control circuit between each one in the plurality of arithmetic converter circuits. Thus, preprocessor circuit uses less resources.

The image processing device may be configured such that the preprocessing circuit includes a plurality of the same type of arithmetic converter circuit; and the plurality of kinds of arithmetic converter circuits are connected in series.

Existing preprocessing circuits are configured with multiple kinds of arithmetic converter circuits, and the following problems can occur when the same type of arithmetic converter circuit performs a process multiple times. That is, for each process, the processing result from the arithmetic converter circuit is temporarily stored in memory outside the preprocessing circuit. However, the execution time increases because the data must be read from the aforementioned memory for the arithmetic converter circuit to execute the process again. This is to guarantee that data is exchanged reliably.

In contrast, the above described configuration is capable of executing processes continuously without storing a processing result in the external memory when the same type of arithmetic converter circuit repeatedly executes a process as a preprocess. It is thus possible to reduce the preprocessing execution time compared to existing techniques.

The aforementioned arithmetic converter circuit may be configured to perform a filtering process on image data.

The above configuration uses a filtering process as a preprocess. Although filtering is a simple computational process, given the larger amount of data handled for image processing, filtering requires very fast computations. In other words, implementing the preprocessing circuit as a programmable circuit such as an FPGA, achieves faster processing compared to execution on a CPU, for instance.

The image processing device may further include: a non-volatile storage unit configured to store startup circuit configuration data for the preprocessing circuit, and a plurality of kinds of partial reconfiguration data used for partial reconfiguration of the arithmetic converter circuits; a volatile storage unit configured for reading data at a higher speed than the non-volatile storage unit; and a memory transfer controller configured to control the transfer of the partial reconfiguration data from the non-volatile storage unit to the volatile storage unit.

With this configuration, the plurality of types of partial reconfiguration data stored in the non-volatile storage unit is retained even through the device is turned off. The partial reconfiguration data may also be forwarded to the volatile storage unit whereby, reading the partial reconfiguration data from the volatile storage unit allows the circuit configuration controller to quickly perform partial reconfiguration.

The data may also be transferred via a memory transfer controller; therefore, the transfer of data from the non-volatile storage unit to the volatile storage unit does not consume CPU resources. This reduces the load on the CPU.

To address the above described deficiencies, according to another embodiment of the invention an image processing method configured to process image data obtained externally, includes: a preprocessing step carried out by a preprocessing circuit configured to carry out preprocessing during image processing; and a circuit configuration controller step configured to carry out partial reconfiguration of the preprocessing circuit; the preprocessing step includes a plurality of arithmetic conversion steps which include performing arithmetic computations and conversions on image data; and a timing control step provided between each one in the plurality of arithmetic conversion steps that are connected in order of processing, the timing control step configured to secure the reliable exchange of data; and the circuit configuration control step carries out partial reconfiguration of at least one of a plurality of arithmetic converter circuits in the preprocessing circuit configured to perform the plurality of arithmetic conversions steps respectively, while not carrying out partial reconfiguration on timing control circuits configured to perform the timing control step in the preprocessing circuit.

In the above configuration, a timing control step is placed between each of the plurality of arithmetic conversion steps, therefore no problems occur in the preprocessing circuit regardless of how the arithmetic conversion step is partially reconfigured.

The configuration is also such that the circuit configuration control step partially reconfigures at least only one arithmetic converter circuit in the preprocessing circuit while not partially reconfiguring the other arithmetic converter circuits or timing control circuits. Consequently, the circuitry for partial reconfiguration is a smaller size. Thus, partial reconfiguration takes less time.

Accordingly, an image processing method can be provided that is capable of further reducing the amount of time a programmable circuit such as an FPGA takes to perform a partial reconfiguration.

To address the above described deficiencies, according to another embodiment of the invention, an image processing method configured to process image data obtained externally, includes: a preprocessing step carried out by a preprocessing circuit configured to carry out preprocessing during image processing; and a circuit configuration controller configured to carry out partial reconfiguration of the preprocessing circuit; preprocessing step includes at least one arithmetic conversion step which includes performing arithmetic computations and conversions on image data, with the arithmetic conversion step configured to include an input step temporarily storing data input thereto, an arithmetic conversion step carrying out arithmetic computation on said temporarily stored data, and an output step temporarily storing the computed data; and the circuit configuration control step carries out partial reconfiguration of at least one arithmetic module in the preprocessing circuit configured to perform the arithmetic computation step, while not carrying out partial reconfiguration on an input module and an output module in the preprocessing circuit configured to perform the input step and the output step respectively.

With this configuration, the circuit configuration control step partially reconfigures at least one arithmetic module in the preprocessing circuit while not partially reconfiguring the other circuits. Consequently, the circuitry for partial reconfiguration is a smaller size. Thus, partial reconfiguration takes less time.

Accordingly, an image processing method can be provided that is capable of further reducing the amount of time a programmable circuit such as an FPGA takes to perform a partial reconfiguration.

Furthermore, the preprocessing step may include a plurality of the same type of arithmetic conversion steps; and the plurality of kinds of arithmetic conversion steps may be executed in series.

The above described configuration is capable of executing processes continuously without storing a processing result in external memory when the same type of arithmetic conversion step is repeatedly executed as a preprocessing step. It is thus possible to reduce the preprocessing execution time compared to existing techniques.

Effects

Embodiments of the invention provide an image processing device, and the like capable of further reducing the amount of time it takes for partial reconfiguration.

BRIEF DESCRIPTION OF THE DRAWINGS

FIG. 6A illustrates the processing that takes place when emphasizing noise in an image by using a derivative n times; FIG. 6B illustrates the processing that takes place where a reduction function is used n times to eliminate noise and expansion function is used n times to return the image to its original size;

FIG. 7 is a flowchart illustrating the flow of processes executed in the image processing device immediately after the device is powered on;

DETAILED DESCRIPTION

First Embodiment

Figure 1:
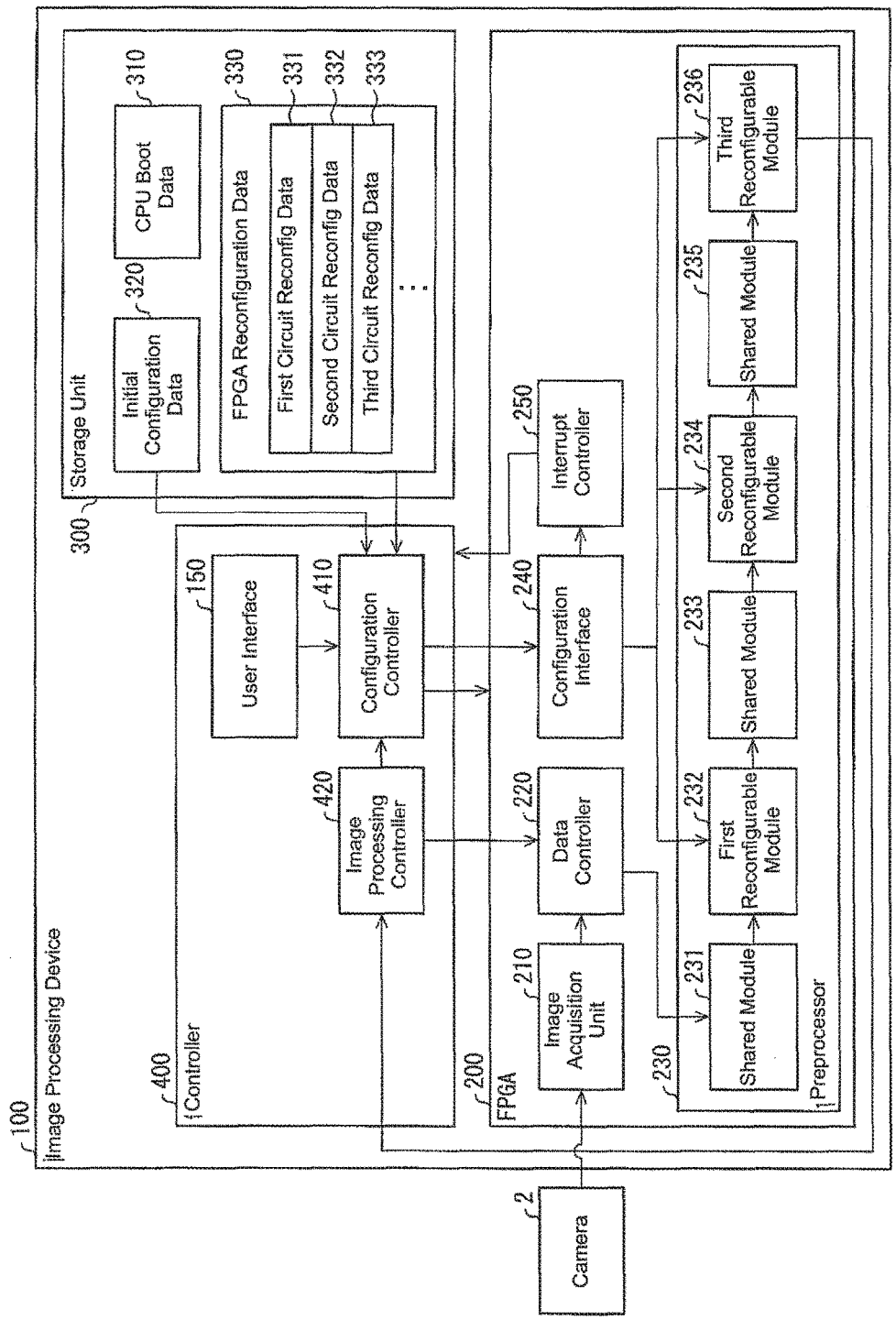
FIG. 1 is a block diagram representing a general configuration of an image processing device according to a first embodiment.

Embodiments of the present invention are described below in detail with reference to FIG. 1 through FIG. 9. The same or corresponding elements within the drawings are given the same reference numerals and the explanations therefor are not repeated. To facilitate understanding of the image processing device 100 which embodies one aspect of the present invention, first an overview of the image recognition system 1 that contains the image processing device 100 is described using FIG. 2.

Overview of the Image Inspection System (First Embodiment)

Figure 2:
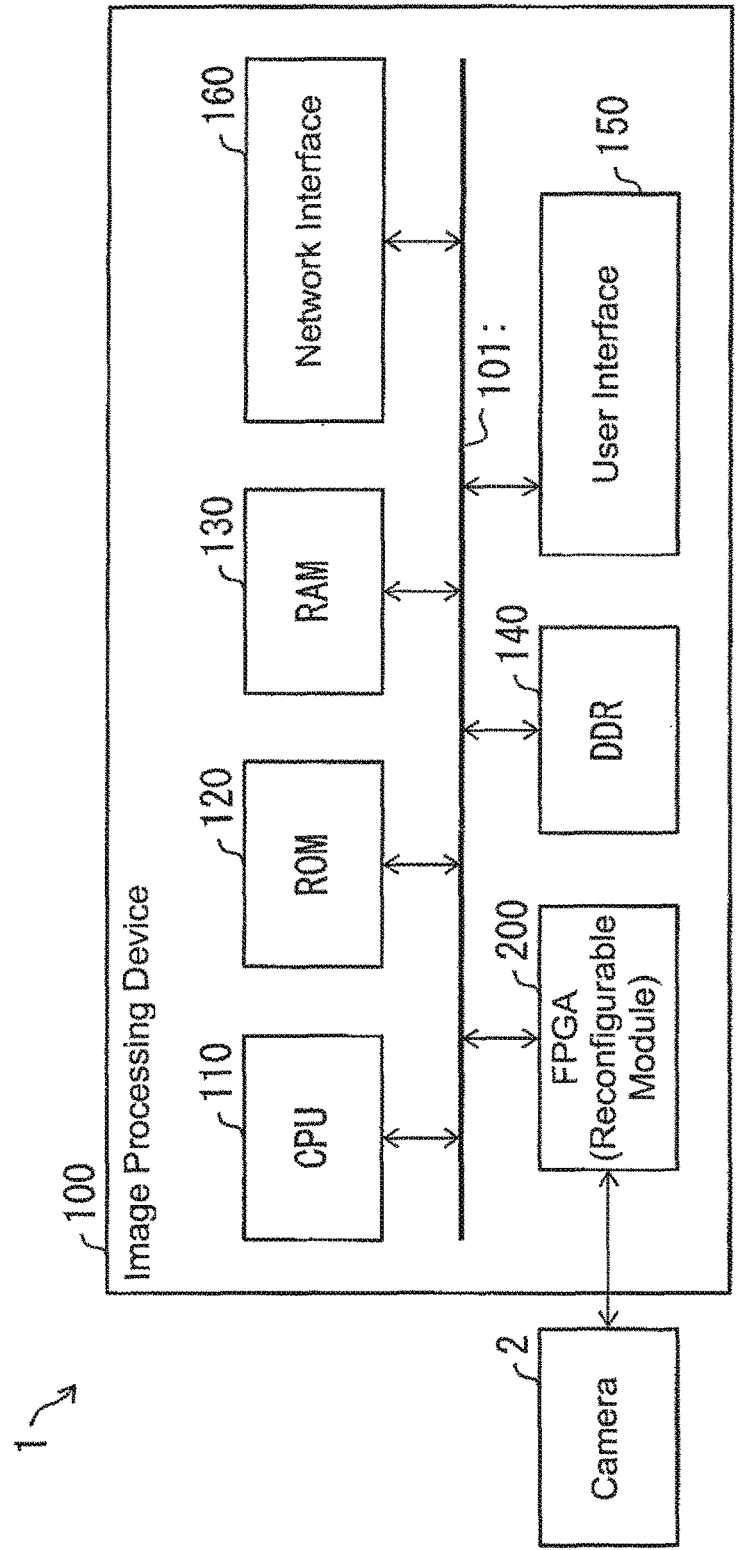
FIG. 2 diagrams an image inspection system that includes the aforementioned image processing device.

FIG. 2 diagrams an image recognition system 1 that includes the image processing device according to the embodiment. As illustrated in FIG. 2, the image recognition system 1 includes a camera 2 and the image processing device 100.

The camera 2 captures an image of an inspection object, and the image recognition system 1 uses the image processing device 100 to process the image, whereby the image recognition system 1 identifies the position of, compares, evaluates, or classifies the inspection object.

The digital camera 2 converts the image information from analog to digital, and is provided with a Complementary Metal Oxide Semiconductor (CMOS) sensor that serves as the photovoltaic imaging element. The imaging element may also be a charge-coupled device (CCD) sensor or any other type of sensor.

The image processing device 100 includes a CPU 110, ROM 120, RAM 130, DDR 140, a user setting interface 150 (also referred to below as user interface; user I/F), a network interface (I/F) 160, and an FPGA, which are connected to a system bus 101.

The CPU 110 is the central computer that controls all the operations of the image processing device 100, which primarily involve image processing. The ROM 120 is non-volatile memory, and stores a booting program that starts up the CPU 110. The ROM 120 also stores data for configuring the later-described FPGA 200.

The RAM 130 is volatile memory that serves as a work area for the CPU 110. The DDR 140 is also volatile memory that serves as a work area when reconfiguring the FPGA 200. The DDR 140 is faster at reading out data than the ROM 120. Therefore, the circuit reconfiguration process may be executed more quickly by transferring a portion of the data stored in the ROM 120 to the DDR 140 when reconfiguring the FPGA 200.

The user interface 150 allows a user to enter operational directives to the image processing device 100, and presents the user with information. The user interface 150 controls the input and output to and from, for example, an image display device such as a display or a touchscreen panel, and input devices such as a keyboard, mouse, or button.

The network interface 160 transmits the various kinds of data resulting from image processing by the image processing device 100 to an external server device or storage device (not shown) via a communication line such as LAN or the Internet. EtherCAT (Registered Trademark) may be adopted as the communication line, for example. The network interface 160 also receives various kinds of data from outside the image processing device 100 via the communication line.

The FPGA 200 is one kind of programmable circuit that functions as a preprocessing circuit performing preprocessing on an image captured by the camera 2. The FPGA 200 (later described) can be partially reconfigured. Although in this embodiment the image processing device 100 includes the FPGA 200, the image processing device 100 may include other programmable circuits that are preprocessing circuits besides the FPGA 200.

Each of the aforementioned components is mutually connected via the system bus 101, to allow for high-speed data exchange.

Figure 3:
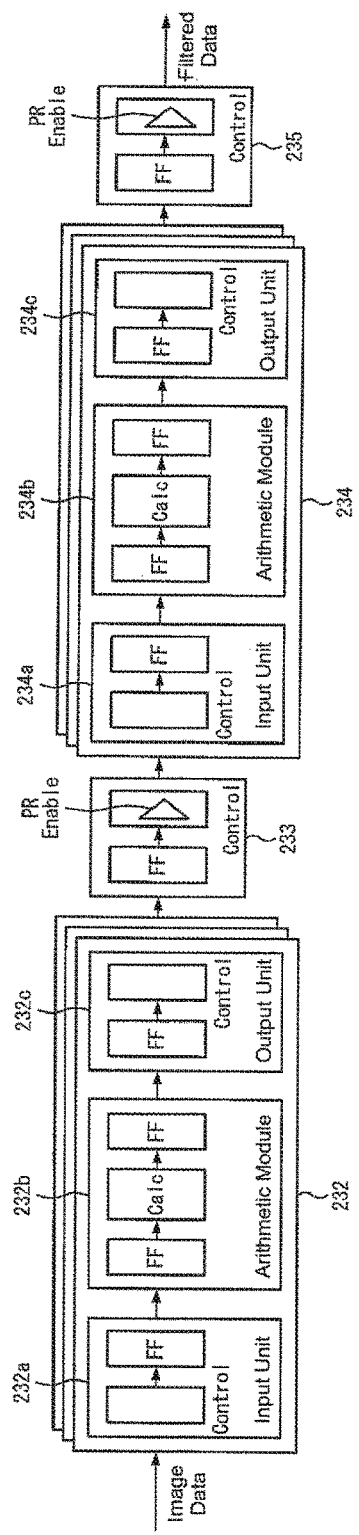
FIG. 3 is a block diagram representing a partial exploded view of a preprocessor module within the preprocessing circuit of the image processing device.
Figure 4:
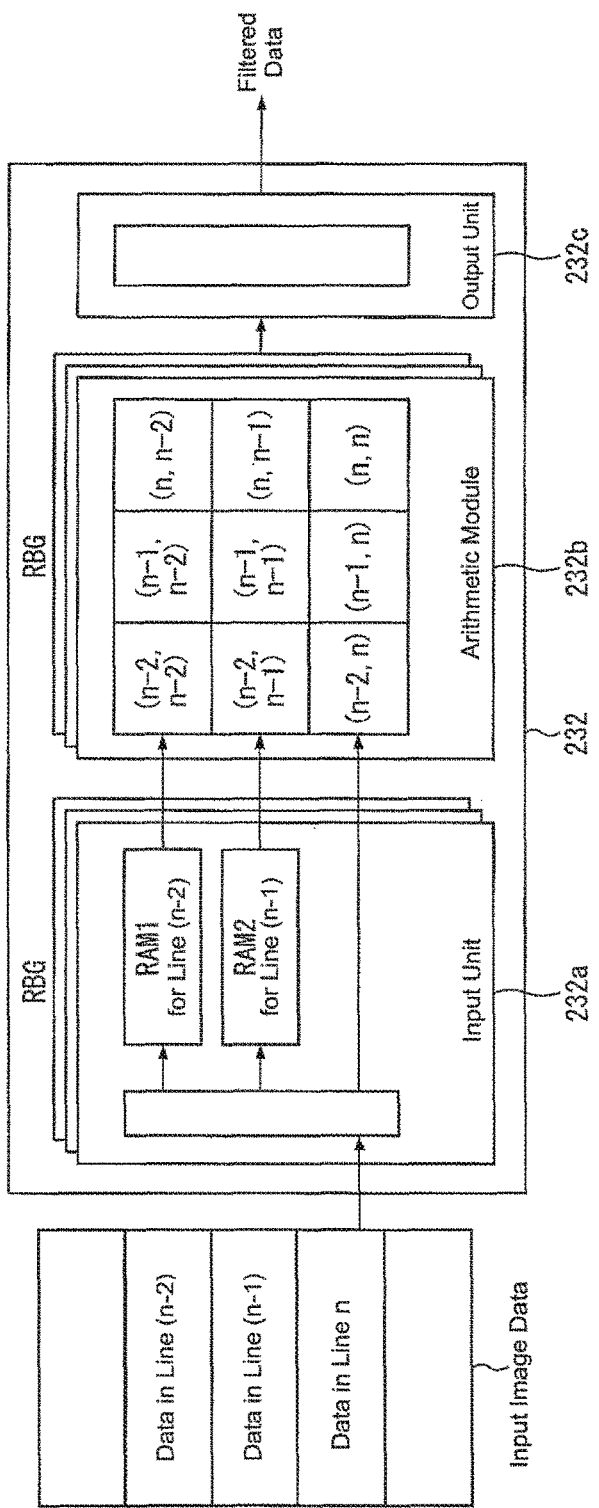
FIG. 4 illustrates the data processing that takes place in a reconfigurable module in the image processing device.

A more detailed description of the image processing device 100 of the embodiment outlined above is provided with reference to FIG. 1, FIG. 3, and FIG. 4.

The Image Processing Device

FIG. 1 is a block diagram representing a general configuration of the image processing device 100 according to the first embodiment.

As illustrated in FIG. 1, the image processing device 100 is equipped with a storage unit 300, a controller 400, and an FPGA 200.

The storage unit 300 stores CPU boot data 310 used to start up the CPU 110, startup configuration data 320 used to initially configure the FPGA 200, and FPGA reconfiguration data 330 used for partial reconfiguration of the FPGA 200. The storage unit 300 corresponds to ROM 120 (FIG. 2).

The FPGA reconfiguration data 330 includes a plurality of types of circuit reconfiguration data and is used in partial reconfiguration of a reconfigurable module in the FPGA 200 (later described); the plurality of types of circuit reconfiguration data includes, first circuit reconfig data 331, second circuit reconfig data 332, third circuit reconfig data 333, and the like, for example.

The controller 400 is provided with a user interface 150 (FIG. 2), a configuration controller 410, and an image processing unit 420. The configuration controller 410 and the image processing unit 420 may be implemented in software and run by the CPU 110 (FIG. 2).

When the image processing device 100 first turns on, the configuration controller 410 uses the aforementioned startup configuration data 320 to initially configure the FPGA 200. This is because data in the FPGA disappears when the image processing device 100 is turned off. A preprocessing circuit in the FPGA 200 may be initialized from this startup configuration. Configuration of the FPGA on startup may be implemented using another technique, and is not particularly limited to using this startup configuration method.

The aforementioned preprocessing circuit executes preprocessing within the process of the image processing device 100 processing images. Within this specification the FPGA 200 is described from the view of an FPGA 200 initially configured as a preprocessing circuit.

Additionally, the description also assumes that the configuration controller 410 carries out partial reconfiguration with the circuit reconfiguration data selected from the FPGA reconfiguration data 330 stored in the storage unit 300.

The image processing controller 420 post processes the image data preprocessed by the FPGA; i.e., the image processing controller 420 identifies the position of, compares, evaluates, or classifies the inspection object, for example. In addition, the image processing controller 420 primarily controls image processing in the image processing device 100, outputs instructions to the configuration controller 410 for partial reconfiguration of the FPGA 200, or outputs instructions for the FPGA 200 to re-execute preprocessing, or the like.

The controller 400 is preferably equipped with a direct memory access controller (DMAC; not shown) to serve as a memory transfer controller. In this case, the DMAC transfers the FPGA reconfiguration data 330 from the storage unit 300 to the DDR 140 during reconfiguration of the FPGA 200. Additionally, the DMAC transfers data on the basis of directives from the CPU 110, thereby reducing the load on the CPU 110.

Here, the configuration controller 410 can significantly increase its data transfer rate (e.g., by as much as four times) by reading the FPGA reconfiguration data 330 from the DDR 140.

Next, the programmable circuit, i.e., the FPGA 200 configured initially as a preprocessing circuit, is described below in detail.

The Programmable Circuit

The FPGA 200 which is the programmable circuit that makes up the preprocessing circuit, includes an image acquisition unit 210, a data controller 220, a preprocessor module 230, a configuration interface 240, and an interrupt controller 250.

The image acquisition unit 210 acquires the image captured by the camera 2 and forwards the image to the data controller 220. The data controller 220 controls the later-described preprocessor module 230 while transferring the data forwarded from the image acquisition unit 210. The data controller 220 may also control the later-described preprocessor module 230 while transferring the data forwarded from the image processing controller 420.

The preprocessor module 230 preprocesses the image data transferred from the data controller 220. The preprocessing performed in the preprocessor module 230 is not fixed; the configuration controller 410 may use the plurality of types of circuit reconfiguration data stored in the storage unit 300 to partially reconfigure the FPGA 200 so that the preprocessor module 230 executes the desired preprocessing.

The configuration interface 240 receives instructions from the configuration controller 410 and partially reconfigures the preprocessor module 230. The interrupt controller 250 receives information from the configuration interface 240 on whether or not partial reconfiguration was successful. Based on this information the interrupt controller 250 generates an interrupt in the CPU 110 which is serving as the controller 400.

The preprocessor module 230 of the embodiment is described below in detail.

The Preprocessor Module

The preprocessor module 230 in the embodiment contains three shared modules, and three reconfigurable modules. The image data transferred from the data controller 220 is processed in order by the shared module 231, reconfigurable module 232, shared module 233, reconfigurable module 234, shared module 235, reconfigurable module 236.

Although the preprocessor module 230 includes three reconfigurable modules in this embodiment, the preprocessor module 230 may contain two or more reconfigurable modules; the number of reconfigurable modules is not limited if a shared module is provided between reconfigurable modules.

The configuration interface reconfigures a reconfigurable module on the bases of instructions from the configuration controller 410 in order to modify the particulars of a preprocess. This circuit reconfiguration uses the desired circuit reconfiguration data selected from the FPGA reconfiguration data 330.

Modifying the particulars of the preprocess may occur based on an instruction from the user, or may occur when the preproccesing is replaced in accordance with a program; the particulars of the preprocess may also be modified when the image processing controller 420 itself detects that the scene in the image changed. In other words, the particulars of the preprocess is modified when it is necessary to change the particulars thereof due to some cause.

Each of the reconfigurable modules 232, 234, 236 is guaranteed certain amount of space in the FPGA 200 so that the circuit may be reconfigured using any of the circuit reconfiguration data in the FPGA reconfiguration data 330.

The reconfigurable modules 232, 234, 236 are each arithmetic converter circuits that perform computations on the image data to convert the image data. The aforementioned arithmetic converter circuit is programmed via the configuration interface 240 using the circuit reconfiguration data. Each of the arithmetic converter circuits constituting the reconfigurable modules 232, 234, 236 may be mutually identical or mutually different sizes on the FPGA 200.

The shared modules 231, 233, 235 are timing control circuits that ensure reliable exchange of image data.

The reconfigurable module and the shared module are described in detail with reference to FIG. 3 and FIG. 4.

Reconfigurable Modules and Shared Modules

FIG. 3 is a block diagram representing a partial exploded view of a preprocessor module 230 within the preprocessing circuit of the image processing device 100. Data flows from left to right in FIG. 3.

As illustrated in FIG. 3, the shared module 233 connects between the reconfigurable module 232 and the reconfigurable module 234.

The arithmetic converter circuit constituting the reconfigurable module in the image processing device 100 according to the embodiment is an image filter. The image filter uses computations to convert the image data and perform edge detection or image expansion or contraction. The reconfigurable module in the image processing device 100 is provided with three image filters, with an image filter corresponding to the R, G, and B in a color image, respectively.

The shared module in the image processing device 100 is a flip-flop circuit (referred to as an FF circuit below) that acts as a timing control circuit ensuring the reliable exchange of data between the image filters. The FF circuits may also be referred to as slice registers.

After an image filter (i.e., the reconfigurable module 232) arithmetically manipulates and converts the image data, the FF circuit (i.e, the shared module 233) secures the timing for transferring data until the data is sent to the next image filter (i.e., the next reconfigurable module 234).

In other words, providing an FF circuit between the image filters ensures that the processed data is transferred to the next image filter (e.g. the reconfigurable module 234) only after the computations from the previous image filter of the three filters (e.g., the reconfigurable module 232) is reliably complete. Providing an FF circuit between that the image filters also ensures that no issues occur during the operation of the preprocessing circuit regardless of how the reconfigurable modules are reprogrammed.

Assuming a case where, for instance, the reconfigurable module 232 and the reconfigurable module 234 are directly connected, erroneous operations are likely to occur such as the computations in the reconfigurable module 234 starting while the computations in the image filter (i.e., the reconfigurable module 232) are incomplete.

The image filter (i.e., the reconfigurable module 232) is made up of an input module 232A that temporarily stores data entering therein, an arithmetic module 232b that performs arithmetic computations on the temporarily stored data, and an output module 232c that temporarily stores the processed data. The image filter (i.e., the reconfigurable module 234) is similarly configured with an input module 234a, and arithmetic module 234b, and an output module 234c.

Data processing within the image filter (i.e., the reconfigurable module 232) is performed as follows, and is described on the basis of FIG. 4. FIG. 4 illustrates the data processing that takes place in the reconfigurable module 232 in the image processing device 100.

As illustrated in FIG. 4, the image filter (i.e., the reconfigurable module 232) is configured by an input module 232a, and arithmetic module 232b, and an output module 232c.

The input image data entering the input module 232a of the image filter (i.e., the reconfigurable module 232) flows in from top to bottom. For instance, data flows into the input module as data in line (n−2), to data in line (n−1), to data in line n, in that order. The data in each of the lines flows into the input module in order from left to right.

The data that has entered the input module 232a is stored in the RAM which is a storage region provided on the FPGA 200. The FPGA 200 in this embodiment is provided with two RAM modules so that the image filter can perform a 3×3 computation in the arithmetic module 232b. Note that the aforementioned RAM is provided to each image filter.

The input module 232a stores the data entered in line (n−2) in the first RAM, and the data entered in line (n−1) in the second RAM; data entered in line n is transferred as is to the arithmetic module 232b.

The arithmetic module 232b performs a 3×3 computation, taking the data from line (n−2) read out from the first RAM, the data from line (n−1) read out from the second RAM, and the data from line n transferred from the input module 232a; the arithmetic module 232b forwards the computed data to the output module 232c.

The output module 232e collects, for instance, the RGB data forwarded by the arithmetic module 232b and outputs the same as processed data.

For example, if the arithmetic module within the image filter performed a 5×5 computation, the FPGA 200 would need four RAM modules per image filter.

In an image processing device 100 provided with the above kind of preprocessing circuit, the following can be said when the configuration controller 410 reconfigures the preprocessing circuit while the device is running.

That is, typically, a programmable logic circuit has only a single image filter, with that image filter built for partial reconfiguration. However, the reconfiguration process takes a comparatively longer time in existing image processing devices because either the entire preprocessing circuit is reconfigured or the entire module that executes preprocessing is reconfigured.

The particulars of preprocessing can be modified by reconfiguring the circuitry for the image filter; that is, a preprocess can be modified by reconfiguring the arithmetic converter circuit constituting the reconfigurable module. In contrast, the FF circuits serving as the timing control circuits (i.e., the shared modules) can be excluded from circuit reconfiguration since these circuits have nothing to do with modifying the particulars of preprocessing.

Therefore, the image processing device 100 of the embodiment selects at least one of the plurality of image filters for partial reconfiguration while excluding the FF circuits from partial reconfiguration when modifying the particulars of preprocessing while the device is running.

Hereby, the circuitry for partial reconfiguration is a smaller size. For instance, the number of shared modules reduces the number of circuits for partial reconfiguration, even when all the reconfigurable modules are reprogrammed. Reducing the size of the circuits that will be partially reconfigured reduces the amount of time needed for data transfer. Thus, partial reconfiguration takes less time.

Accordingly, the image processing device in this embodiment is capable of further reducing the amount of time a programmable circuit such as an FPGA takes to be partially reconfigured.

The image processing device 100 in this embodiment also has the following advantages. These advantages are described on the basis of FIGS. 5A and 5B, and FIGS. 6A and 6B.

Figure 5A:
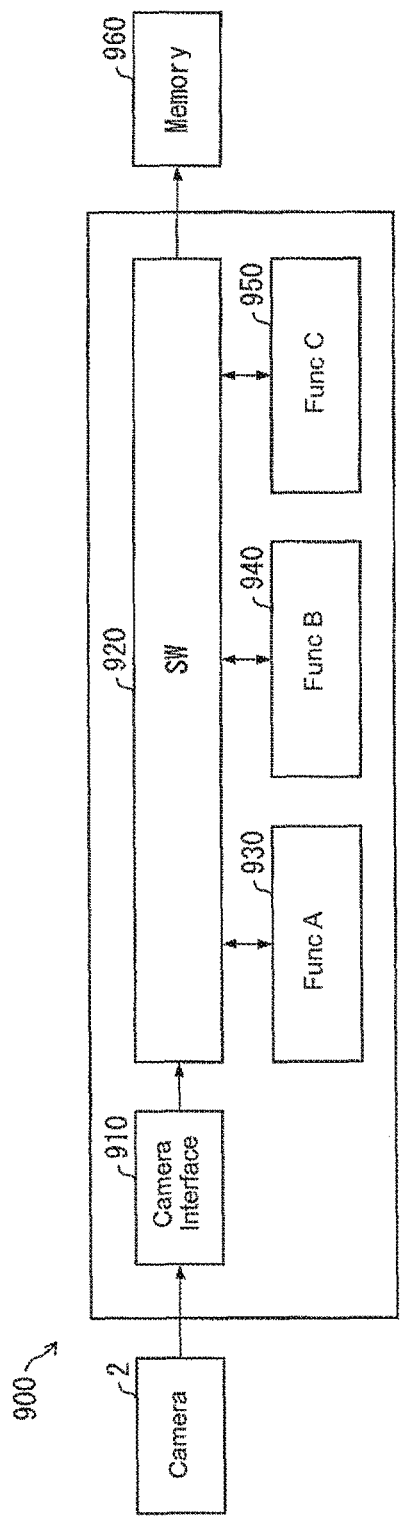
FIG. 5A is a block diagram of a configuration of a preprocessing circuit in a typical image processing device containing a plurality of preprocessing functions.

FIG. 5A is a block diagram of a configuration of a preprocessing circuit 900 in a typical image processing device containing a plurality of preprocessing functions.

Figure 5B:
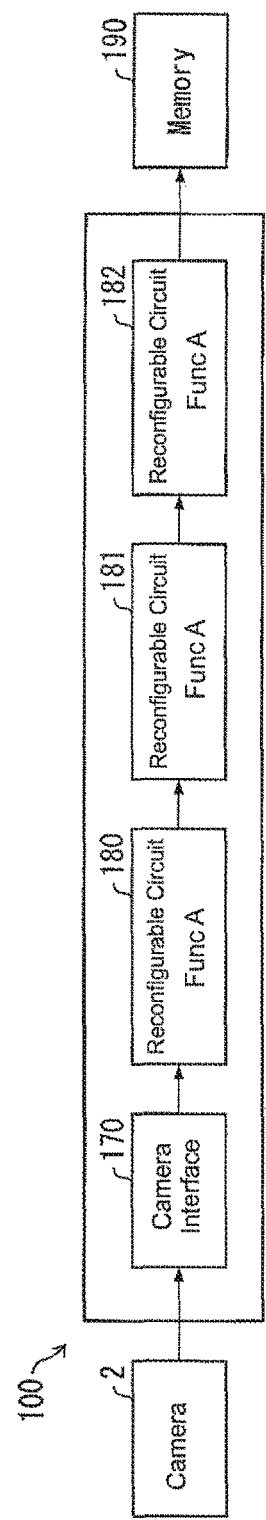
FIG. 5B is a block diagram outlining a configuration of a preprocessing circuit in the image processing device according to the first embodiment wherein a plurality of reconfigurable circuits are programmed with the same kind of preprocessing function.

FIG. 5B is a block diagram of a configuration of a preprocessing circuit in the image processing device 100 of the embodiment wherein a plurality of reconfigurable circuits is programmed with the same kind of preprocessing function.

First, a case is described where the same kind of preprocessing function in the preprocessing circuit processes the image data in the typical image processing device 900.

As illustrated in FIG. 5A, the preprocessing circuit in the typical image processing device 900 includes a built-in camera interface 910, a switch 920, function A preprocessor circuit 930, function B preprocessor circuit 940, and function C preprocessor circuit 950 each connected to the switch 920. The preprocessing circuit in the image processing device 900 is connected to an external camera 2 and a memory 960.

The data captured by the camera 2 is transferred to the camera interface 910 and thereafter transferred to the switch 920. For instance, preprocessing in the typical image processing device 900 may be performed in the following cases when the function A preprocessor circuit carries out preprocessing three times.

That is, the switch 920 transfers data to the function A preprocessor circuit 930, and data A1 resulting from operations and conversions performed on the data by the function A preprocessor circuit is transferred to and stored in the memory 960. At this point, processing is not performed again by the function A preprocessor circuit 930 until all the processing by the function A preprocessor circuit 930 is terminated.

The data A1 is then read out from memory the memory 960, again transferred to the function A preprocessor circuit 930 to carry out preprocessing again, and the data A2 output from the function A preprocessor circuit 930 output to the memory 960 and stored therein. The data A2 is then read out from the memory 960, transferred to the function A preprocessor circuit 930 and processing performed a third time.

Preprocessing in this manner in the typical image processing device 900 requires repeating the processes of function switching by the switch 920, writing to the external memory 960, and reading out from memory, and thus preprocessing requires a relatively longer time.

In contrast, the image processing device 100 according to the embodiment operates as follows when a plurality of the same kind of preprocessing is performed.

As illustrated in FIG. 5B, the preprocessing circuit in the image processing device 100 according to the embodiment, which is programmed with identical preprocessing functions, includes a camera interface 170, and three reconfigurable circuits 180, 181, 182.

The camera interface 170 is equivalent to the image acquisition unit 210 and the data controller 220 (FIG. 1).

The preprocessing circuit in the image processing device 100 is connected to an external camera 2 and memory 190.

The data captured by the camera 2 is transferred to the camera interface 170 and processed in series by three reconfigurable circuits 180, 181, 182 which each have the same kind of preprocessing function. In this case, the data operated on and converted by the first reconfigurable circuit 180 can be sent to the next reconfigurable circuit 181.

A concrete example of a case requiring repeated processing using the same kind of preprocessing function is described below on the basis of FIGS. 6A and 6B.

FIG. 6A depicts a process where noise is emphasized by using a differential function n times. FIG. 6B illustrates the processes of eliminating noise by using a reduction function n times, and returning an image to its original size by using an expansion function n times.

As illustrated in FIG. 6A, repeating the differential process on an image containing noise emphasizes the edges of the noise data. The portion of the edge that is at or above a given threshold is considered noise, and removing that noise portion from the image, removes noise from the image.

Further, as illustrated in FIG. 6B, a function reducing an image may be used repeatedly on an image including includes noise data, whereby the noise data is removed from the image. The image, with the noise data removed, can be passed through an expansion function repeatedly to return the image to its original size. This removes noise from the image.

Thus, with the image processing device 100 of the embodiment, the preprocessing circuit is partially reconfigured with a plurality of circuits having the same function; hereby this above kind of repeated processing can be carried out continuously without needing to store the processing results in the external memory. It is thus possible to reduce the preprocessing execution time compared to existing techniques.

Here ends a detailed description of the image processing device 100; the flow of processes executed in this image processing device 100 is described next using FIG. 7 through FIG. 9.

Processes Executed in the Image Processing Device

Figure 7:
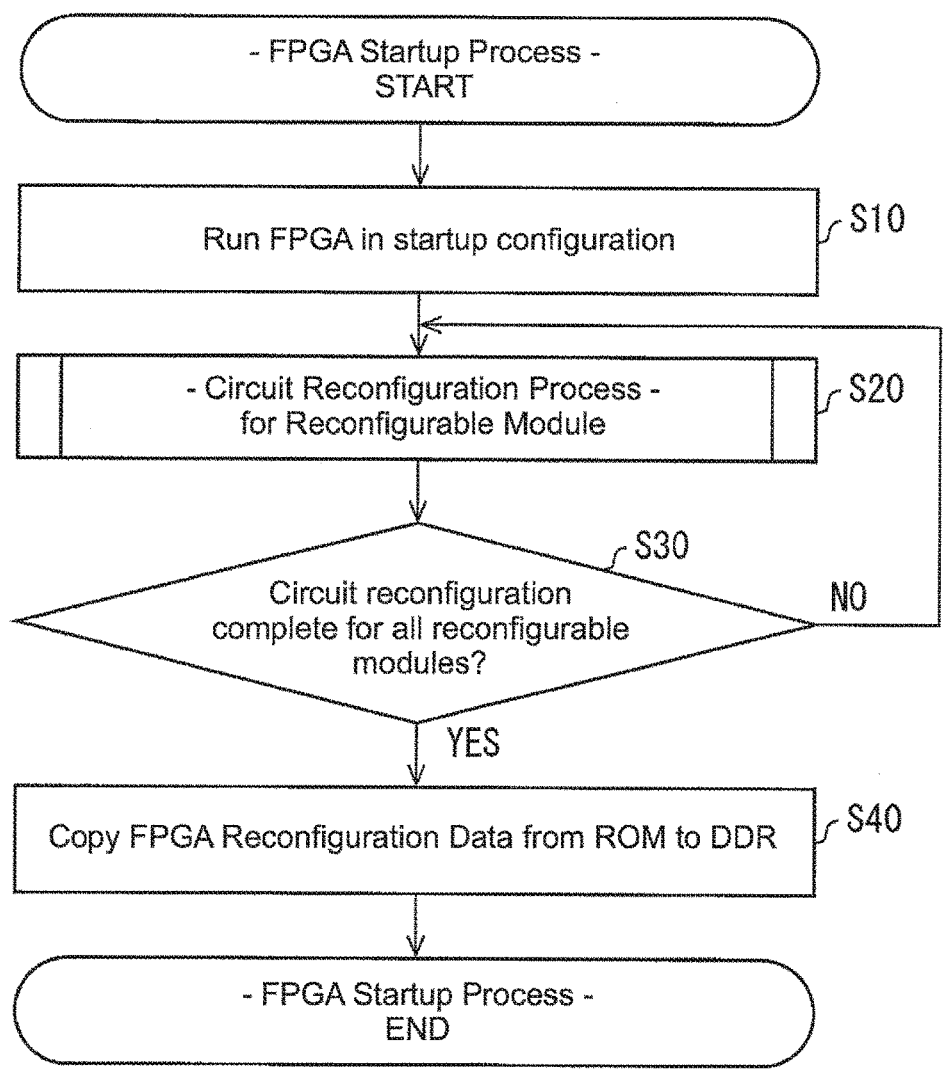

FIG. 7 is a flowchart illustrating the flow of processes executed in the image processing device 100 immediately after the device is powered on.

As illustrated in FIG. 7, the image processing device 100 begins to setup the FPGA 200 immediately after the device is turned on.

First, the configuration controller 410 reads the startup configuration data from the storage unit 300, executes startup configuration of the FPGA 200 on the basis of said data, and programs the FPGA 200 as the preprocessing circuit (S10)

The configuration controller 410 uses FPGA reconfiguration data 330 to reconfigure the circuitry of the reconfigurable module in the preprocessor module 230.

The configuration controller 410 continues the reconfiguration process if reconfiguration of all the reconfigurable modules in the preprocessor module 230 is incomplete (NO at S30).

Once reconfiguration of all the reconfigurable modules in the preprocessor module 230 is complete (YES at S30), the FPGA reconfiguration data 330 stored in the storage unit 300, which is equivalent to the ROM 120, is transferred to the DDR 140 and stored (S40).

At this point, the image processing device 100 terminates initial setup of the FPGA 200.

The processes executed by the image processing device 100 with respect to the reconfigurable modules in the preprocessor module 230 during partial reconfiguration is described below using FIG. 8.

Figure 8:
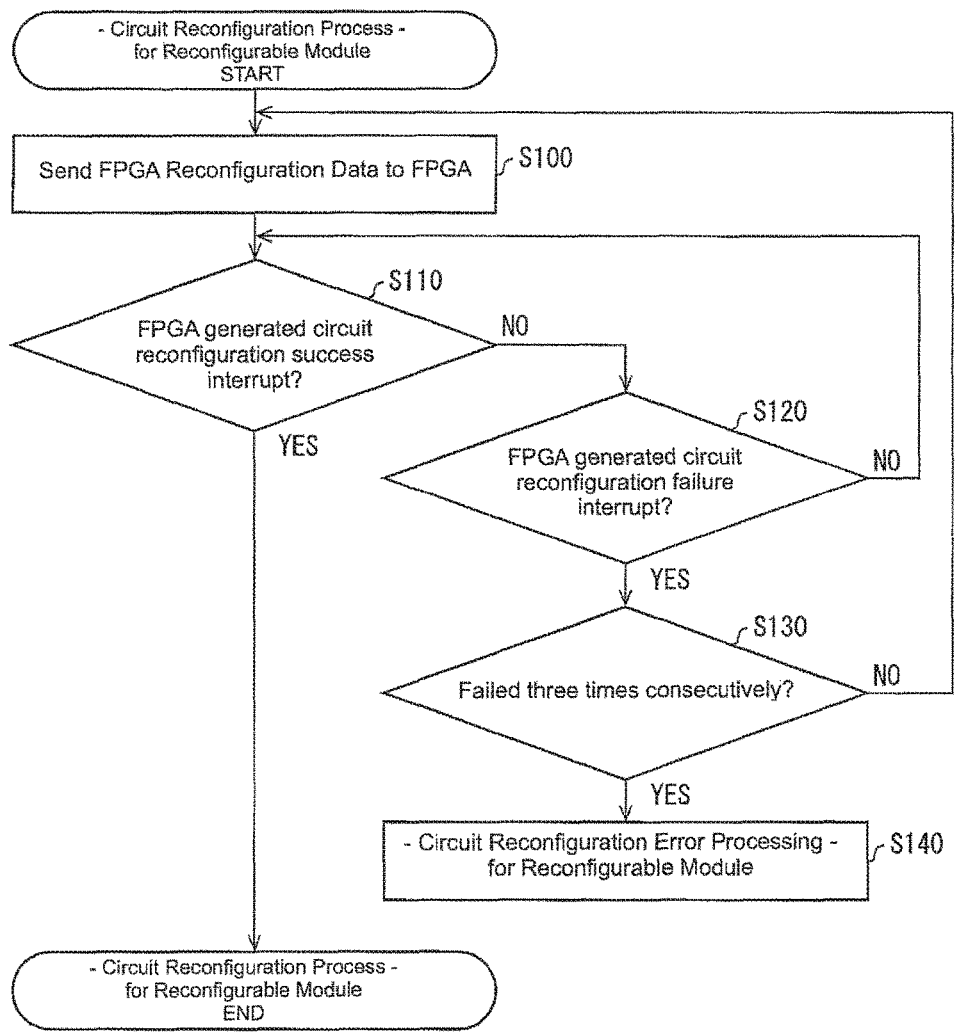
FIG. 8 is a flowchart illustrating the processes executed by the image processing device on the reconfigurable modules in the preprocessing circuit during a partial reconfiguration.

FIG. 8 is a flowchart illustrating the processes executed by the image processing device on the reconfigurable modules in the preprocessing circuit during a partial reconfiguration.

As illustrated in FIG. 8, first, the configuration controller 410 selects from a plurality of types of circuit reconfiguration data included in the FPGA reconfiguration data, and transmits the desired circuit reconfiguration data to the FPGA 200 (S100).

The configuration interface 240 reconfigures the desired reconfigurable module on the basis of the circuit reconfiguration data sent from the configuration controller 410. On receiving information from the configuration interface 240 that circuit reconfiguration was successful (YES at S110), the interrupt controller 250 generates a success interrupt in the CPU 110 serving as the controller 400 indicating that circuit reconfiguration was successful. The circuit reconfiguration of the reconfiguration module is then terminated in this case.

On the other hand, if no success interrupt is generated (NO at S110), and the interrupt controller 250 has not received information from the configuration interface 240 that reconfiguration failed (NO at S120), the configuration interface 240 retries reconfiguring the desired reconfigurable module.

On receiving information from the configuration interface 240 that circuit reconfiguration failed (YES at S120), the interrupt controller 250 generates a failure interrupt in the CPU 110 serving as the controller 400 indicating that circuit reconfiguration failed.

When a failure interrupt is generated and the reconfiguration has failed three times (YES at S130), the CPU 110 acting as the controller 400 executes a circuit reconfiguration failure process that generates a notification indicating that reconfiguration of the reconfigurable module failed.

When reconfiguration has failed less than three times in succession (NO at S130), the configuration controller 410 resends the desired circuit reconfiguration data to the FPGA 200, and the image processing device repeats the steps S100 through S130.

A procedure executed by the image processing device 100 to partially reconfigure the preprocessing circuit is described below with reference to FIG. 9. The procedure described takes place when a user or program modifies the parameters of the preprocess while the image processing device is running.

Figure 9:
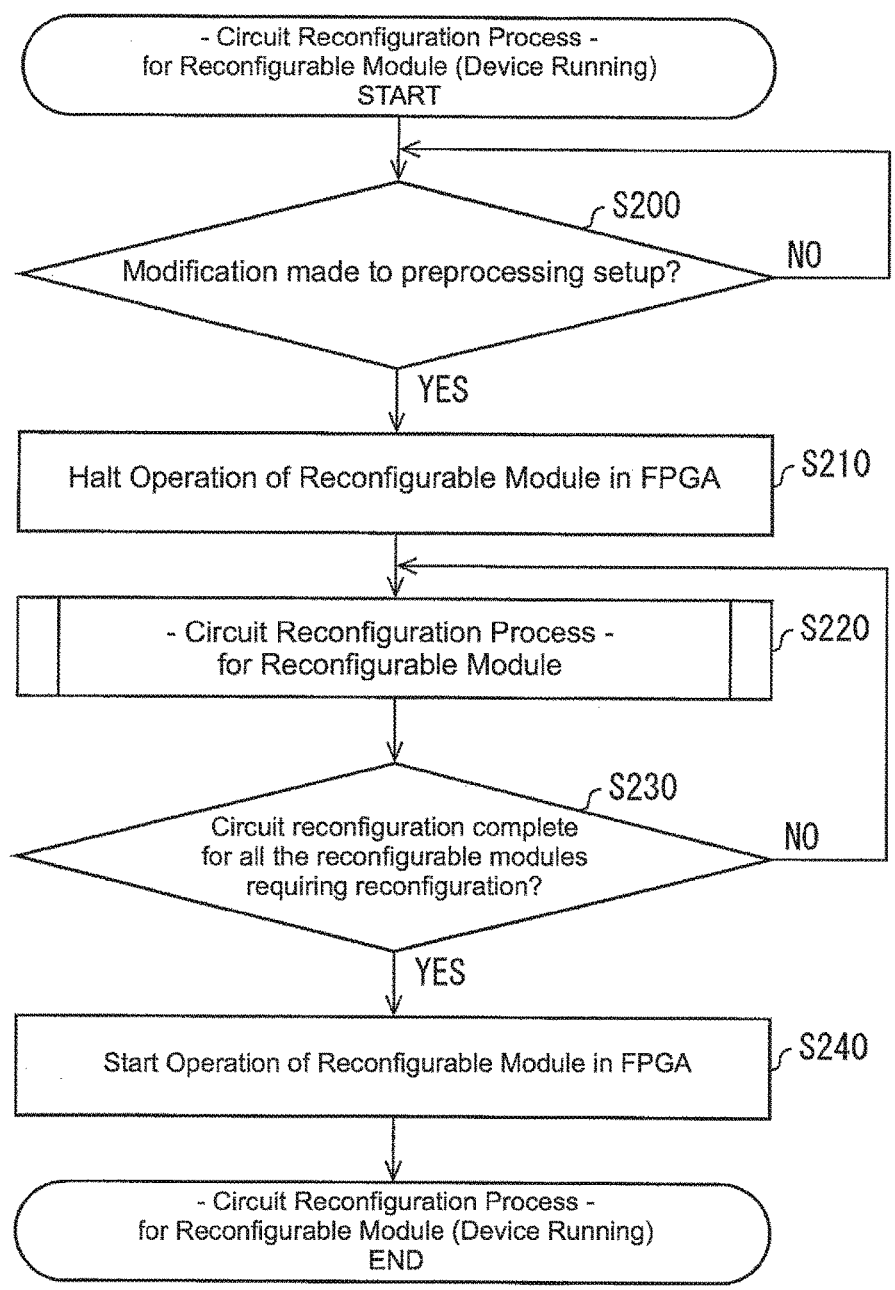
FIG. 9 is a flowchart illustrating the flow of processes during a partial reconfiguration executed by the image processing device on a reconfigurable module in the preprocessing circuit, when the preprocess parameters are modified while the device is running.

FIG. 9 is a flowchart illustrating the flow of processes during a partial reconfiguration executed by the image processing device on the reconfigurable module in the preprocessing circuit, when the preprocess parameters are modified while the device is running.

As illustrated in FIG. 9, when the preprocess parameters are modified while the device is running (YES at S200), the image processing device 100 halts operation of the reconfigurable module in the FPGA 200 (S210).

The configuration controller 410 sends the FPGA 200 the desired circuit reconfiguration data selected from the plurality of kinds of circuit reconfiguration data contained in the FPGA reconfiguration data 330; and the configuration interface 240 executes a process to reconfigure the desired reconfigurable module (S220).

This step S220 is repeated for all the reconfigurable modules requiring reconfiguration so long as the circuit reconfiguration process has not ended (NO at S230). The image processing device 100 starts operations of the reconfigurable module in the FPGA 200 when the circuit reconfiguration process ends for all the reconfigurable modules requiring reconfiguration (YES at S240).

The image processing device 100 ends the partial reconfiguration process for the reconfigurable module taking place in the preprocessing circuit while the device is running.

Given the above detailed explanation, the image processing techniques executed by the image processing device 100 can be presented as follows. That is, the image processing techniques executed by the image processing device 100 is run on image data obtained externally, and includes preprocessing executed during the aforementioned image processing that is executed by a preprocessing circuit, and control of circuit configuration which takes place during partial reconfiguration of the preprocessing circuit. The preprocessing step includes at least one arithmetic conversion step where an arithmetic converter circuit performs arithmetic computations and conversions on the image data, with the arithmetic conversion step configured to include an input step temporarily storing data input thereto, an arithmetic computation step carrying out arithmetic computations on said temporarily stored data, and an output step temporarily storing the computed data. An input module, an arithmetic module, and an output module in the arithmetic converter circuit carry out the aforementioned steps. The circuit configuration control step carries out partial reconfiguration on at least one arithmetic module that executes an arithmetic computation step within the preprocessing circuit, but does not partially reconfigure the input module and the output module that executes the input step and the output step in the preprocessing circuit.

In the above configuration, a timing control step is placed between each of the plurality of arithmetic conversion steps, therefore no problems occur in the preprocessing circuit regardless of how an arithmetic conversion step is partially reconfigured.

The configuration is also such that the circuit configuration control step partially reconfigures at least only one arithmetic converter circuit in the preprocessing circuit while not partially reconfiguring the other arithmetic converter circuits or timing control circuits. The circuitry for partial reconfiguration is therefore a smaller size. Thus, partial reconfiguration takes less time.

Accordingly, an image processing method can be provided that is capable of further reducing the amount of time a programmable circuit such as an FPGA takes to perform a partial reconfiguration.

Note that the term "configuration" as used in this description is a term specific to FPGAs within the realm of programmable logic circuits. It is therefore clear that when the image processing device is equipped with programmable logic circuits that are not FPGAs, an equivalent term may be used in place of "configuration" when endeavoring to understand the details of this description.

Second Embodiment

Yet another embodiment can be described below based on FIG. 10. In order to be brief, only the configurations distinct from the first embodiment are described. That is, the makeup described for the first embodiment can be included in this embodiment. Additionally, the definitions for the terms described for the first embodiment are the same.

Figure 10:
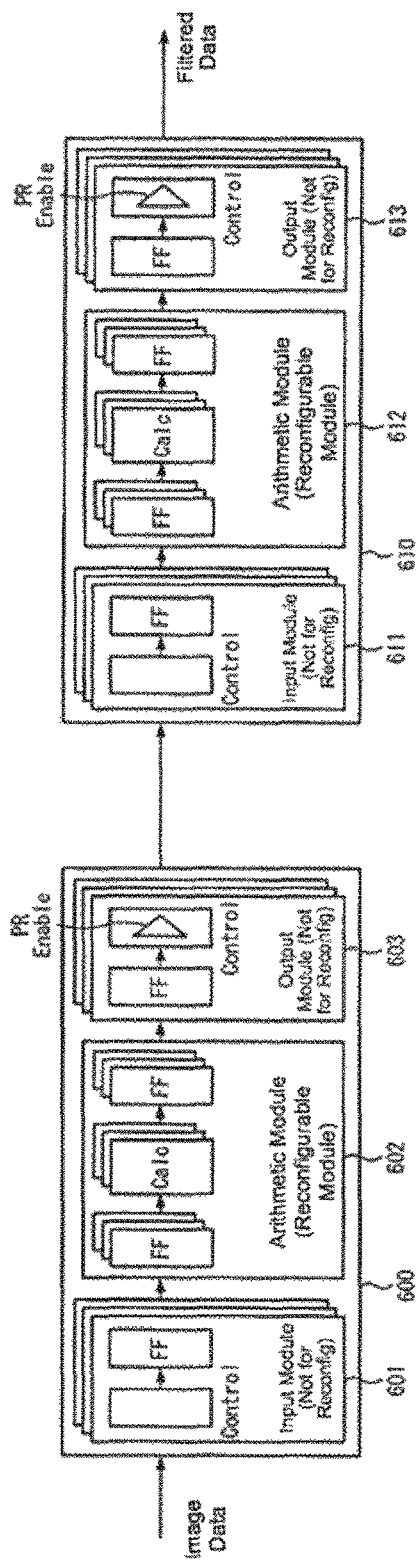
FIG. 10 is a block diagram representing a partial exploded view of a preprocessor module within the preprocessing circuit in the image processing device.

FIG. 10 is a block diagram representing a partial exploded view of a preprocessor module within the preprocessing circuit in the image processing device 100.

The image processing device 100 in the second embodiment partially reconfigures only the arithmetic modules in the arithmetic converter circuits making up the partial reconfiguration module in the preprocessing circuit. The second embodiment differs from the first embodiment in that the input module and the output module are shared modules, and there are no FF circuits acting as shared modules between each of the arithmetic converter circuits.

As illustrated in FIG. 10 the preprocessor module in the preprocessing circuit of the image processing device 100 includes two image filters 600, 610 that serve as the arithmetic converter circuits.

The image filter 600 is made up of an input module 601, an arithmetic module 602, and an output module 603; the image filter 610 is made up of an input module 611, and arithmetic module 612, and an output module 613.

The configuration controller 410 in the image processing device 100 according to this embodiment partially reconfigures the arithmetic module 602 and the arithmetic module 612, while leaving the input module 601, the output module 603, the input module 611, and the output module 613 untouched. In other words, the input module 601, the output module 603, the input module 611, and the output module 613 are shared modules.

Thus, when the image processing device 100 is partially reconfiguring the preprocessing circuit, the configuration controller 410 partially reconfigures at least one of the aforementioned arithmetic modules while not partially reconfiguring the other circuits. Consequently, the circuitry for partial reconfiguration is a smaller size. Thus, partial reconfiguration takes less time.

Accordingly, an image processing device can be provided that is capable of further reducing the amount of time a programmable circuit, such as an FPGA, takes to perform a partial reconfiguration.

The input modules and the output modules of the image filters are treated as shared modules and thus not subject to partial reconfiguration. Therefore, the image processing device 100 is able to ensure reliable exchange of data even if there are no FF circuits provided between the image filter 600 and the image filter 610. Thus, preprocessor circuit uses less resources.

Given the above detailed explanation, the image processing techniques run by the image processing device 100 according to this embodiment can be presented as follows. That is, the image processing techniques run by the image processing device 100 is run on image data obtained externally, and includes preprocessing executed during the aforementioned image processing that is run by a preprocessing circuit, and control of circuit configuration which takes place during partial reconfiguration of the preprocessing circuit. The aforementioned preprocessing step includes at least one arithmetic conversion step which includes performing arithmetic computations and conversions on the image data, with the arithmetic conversion step configured to include an input step temporarily storing data input thereto, an arithmetic computation step carrying out arithmetic computations on said temporarily stored data, and an output step temporarily storing the computed data. The circuit configuration control step carries out partial reconfiguration on at least one arithmetic module that executes an arithmetic computation step within the preprocessing circuit, but does not partially reconfigure the input module and the output module that executes the input step and the output step in the preprocessing circuit.

With this configuration, the circuit configuration control step partially reconfigures at least one arithmetic module in the preprocessing circuit while not partially reconfiguring the other circuits. Consequently, the circuitry for partial reconfiguration is a smaller size. Thus, partial reconfiguration takes less time.

Accordingly, an image processing method can be provided that is capable of further reducing the amount of time a programmable circuit such as an FPGA takes to perform a partial reconfiguration.

Example of a Software Implementation

The control block in the image processing device 100 may be implemented as a logic circuit created from integrated circuits (IC chips) or the like (i.e., in hardware), or as software run on a CPU.

In the case of the latter, the image processing device 100 is equipped with, for example: a CPU that executes commands from a program, i.e. software that realizes each of the functions of the image processing device; a ROM or storage device (also referred to as a recording medium), onto which the above-mentioned program and various kinds of data are recorded and from which the same can be read by a computer (or CPU); and a RAM into which the above mentioned program can be expanded. The computer (or CPU) may read the above mentioned program from the above mentioned recording medium, and execute the program whereby the computer realizes an embodiment of the invention. The above mentioned recording medium may be a non-transitory physical medium such as a tape, disc, card, semiconductor memory, or programmable logic circuit. The above mentioned program may also be supplied to the computer via any desired transmission medium capable of transferring the program (for example, a communication network, or broadcast waves). Finally, embodiments of the invention may also be implemented in the form of data signals encapsulated in carrier waves that are realized through the electronic transmission of the above mentioned program.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

The invention claimed is:

1. An image processing device configured to process image data obtained externally, the image processing device comprising:
   a preprocessing circuit configured to carry out preprocessing during image processing; and
   a circuit configuration controller configured to carry out partial reconfiguration of the preprocessing circuit; wherein
   the preprocessing circuit comprises a preprocessor module comprising:
   a plurality of arithmetic converter circuits configured to perform arithmetic computations on image data to convert the image data; and
   a timing control circuit provided between each one in the plurality of arithmetic converter circuits connected in order of processing, the timing control circuit configured to secure the reliable exchange of data, and
   the circuit configuration controller halts operation of the preprocessor module when partially reconfiguring the preprocessor module for carrying out desired preprocessing, the circuit configuration controller partially reconfiguring at least one arithmetic converter circuit in the plurality of arithmetic converter circuits while not partially reconfiguring the timing control circuits, and the circuit configuration controller starts operation of the preprocessor module after circuit reconfiguration processes end for all of the plurality of arithmetic converter circuits requiring reconfiguration in the preprocessor module.

2. An image processing device configured to process image data obtained externally, the image processing device comprising:
   a preprocessing circuit configured to carry out preprocessing during image processing; and
   a circuit configuration controller configured to carry out partial reconfiguration of the preprocessing circuit; wherein
   the preprocessing circuit comprises a preprocessor module comprising: at least one arithmetic converter circuit configured to perform arithmetic computations on image data to convert the image data, the at least one arithmetic converter circuit comprises an input module configured to temporarily store data entering therein, an arithmetic module configured to perform arithmetic computations on the temporarily stored data, and an output module configured to temporarily store the computed data, and the circuit configuration controller halts operation of the preprocessor module when partially reconfiguring the preprocessor module for carrying out desired preprocessing, the circuit configuration controller carrying out partial reconfiguration of the arithmetic module of the at least one arithmetic converter circuit, while not carrying out partial reconfiguration of the input module and the output module, and the circuit configuration controller starts operation of the preprocessor module after circuit reconfiguration processes end for all of the arithmetic modules of the at least one arithmetic converter circuit requiring reconfiguration in the preprocessor module.

3. The image processing device according to claim 1, wherein the preprocessing circuit comprises a plurality of of arithmetic converter circuits of the same kind; and the plurality of arithmetic converter circuits of the same kind is connected in series.

4. The image processing device according to claim 1, wherein the plurality of arithmetic converter circuits are configured to perform a filtering process on image data.

5. The image processing device according to claim 1, further comprising:

a non-volatile storage unit configured to store startup circuit configuration data for the preprocessing circuit and a plurality of kinds of partial reconfiguration data used for partial reconfiguration of the plurality of arithmetic converter circuits;

a volatile storage unit configured for reading data at a higher speed than the non-volatile storage unit; and a memory transfer controller configured to control the transfer of the partial reconfiguration data from the non-volatile storage unit to the volatile storage unit.

6. An image processing method configured to process image data obtained externally, the image processing method comprising:

a preprocessing step carried out by a preprocessing circuit configured to carry out preprocessing during image processing, the preprocessing circuit comprising a preprocessor module comprising:

a plurality of arithmetic converter circuits configured to perform arithmetic computations on image data to convert the image data, and a timing control circuit provided between each one of the plurality of arithmetic converter circuits connected in order of processing, the timing control circuit configured to secure the reliable exchange of data; and a circuit configuration control step comprising performing partial reconfiguration of the preprocessing circuit; wherein the preprocessing step comprises a plurality of arithmetic conversion steps comprising performing arithmetic computations on image data to convert the image data; and a timing control step is provided between each one in the plurality of arithmetic conversion steps that are carried out in order of processing, the timing control step configured to secure the reliable exchange of data;

the circuit configuration control step carries out partial reconfiguration of at least one of the plurality of arithmetic converter circuits in the preprocessing circuit, while not carrying out partial reconfiguration on the timing control circuits;

the circuit configuration control step halts operation of the preprocessor module when partially reconfiguring the preprocessor module; and the circuit configuration control step starts operation of the preprocessor module after circuit reconfiguration processes end for all the arithmetic converter circuits requiring reconfiguration in the preprocessor module.

7. The image processing method according to claim 6, wherein the preprocessing step comprises a plurality of kinds of arithmetic conversion steps; and the plurality of kinds of arithmetic conversion steps is executed in series.

8. A non-transitory computer readable medium comprising: an information processing program recorded thereon, the information processing program configured to cause a computer to function as an image processing device according to claim 1; wherein the information processing program causes the computer to function as the preprocessing circuit and the circuit configuration controller in the image processing device.

* * * * *